United States Patent
Padmanabhan et al.

(10) Patent No.: US 10,097,437 B2
(45) Date of Patent: Oct. 9, 2018

(54) EFFICIENT MANAGEMENT OF VIRTUALIZED SESSION RESOURCES

(71) Applicant: Citrix Systems, Inc., Fort Lauderdale, FL (US)

(72) Inventors: Prasanna C. Padmanabhan, Redmond, WA (US); Orin D. Lincoln, Columbus, GA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 318 days.

(21) Appl. No.: 14/927,692

(22) Filed: Oct. 30, 2015

(65) Prior Publication Data

US 2017/0126528 A1    May 4, 2017

(51) Int. Cl.
*G06F 15/173*    (2006.01)
*H04L 12/26*    (2006.01)
*G06F 9/00*    (2006.01)

(52) U.S. Cl.
CPC ............ *H04L 43/0876* (2013.01); *G06F 9/00* (2013.01)

(58) Field of Classification Search
CPC ............. H04L 65/4038; H04L 65/4046; H04L 65/605; H04L 65/403; H04L 65/1073
See application file for complete search history.

(56) References Cited

U.S. PATENT DOCUMENTS 7,962,563 B2 *   6/2011   Becker-Szendy .......................... G06F 17/30067
                                                                              709/212
8,209,695 B1 *   6/2012   Pruyne .................. G06F 9/5077
                                                                              709/226
8,307,174 B1 *   11/2012  Misra .................... G06F 3/0617
                                                                              711/161
2003/0177406 A1 *  9/2003  Bradley ................. G06F 1/206
                                                                              713/300
2009/0041353 A1 *  2/2009  Hoff .................... G06F 17/30879
                                                                              382/183
2009/0248869 A1 * 10/2009  Ghostine ................ H04W 8/30
                                                                              709/225
2010/0293453 A1 * 11/2010  Schwarz ........... G06F 17/30867
                                                                              715/234

(Continued)

FOREIGN PATENT DOCUMENTS

WO           055368       4/2009

OTHER PUBLICATIONS

Manage Server OS machine server load; Downloaded May 24, 2018 from https://docs.citrix.com/en-us/xenapp-and-xendesktop/7-5/cds-manage-delivery-groups-wrapper/cds-hosted-shared-desktop-load-mgt-concepts.html.

(Continued)

*Primary Examiner* — Umar Cheema
*Assistant Examiner* — Anh Nguyen
(74) *Attorney, Agent, or Firm* — BainwoodHuang

(57) ABSTRACT

A technique for managing virtualized user sessions in an electronic system generates schedules of expected session usage adaptively, based on actual numbers of user sessions allocated while operating the electronic system, and provides capacity for running user sessions from powered-on servers ready to accept new user sessions. The electronic system allocates user sessions in response to requests and tracks numbers of allocated user sessions. As schedules of expected session usage are adjusted based on actual session usage, schedules tend to become more accurate over time and can adapt to changes in usage patterns.

20 Claims, 6 Drawing Sheets

(56) References Cited

U.S. PATENT DOCUMENTS

| | | | |
|---|---|---|---|
| 2011/0273213 A1* | 11/2011 | Rama | H04W 52/029 |
| | | | 327/291 |
| 2015/0278061 A1* | 10/2015 | Siciliano | H04L 47/762 |
| | | | 702/186 |
| 2016/0028649 A1* | 1/2016 | Herington | G06F 1/3203 |
| | | | 709/226 |

OTHER PUBLICATIONS

Power manage Desktop OS machines;Downloaded May 24, 2018 from https://docs.citrix.com/en-us/xenapp-and-xendesktop/7-5/cds-manage-delivery-groups-wrapper/cds-control-power-management-rho.html.

* cited by examiner

EFFICIENT MANAGEMENT OF VIRTUALIZED SESSION RESOURCES

BACKGROUND

Software virtualization technologies provide hosting services that enable users to connect to virtualized user sessions over a network for running userspace instances separate from the users' own local machines. Examples of software virtualization technologies include VDI (Virtual Desktop Infrastructure) and RDS (Remote Desktop Service). Such virtualization technologies may be used for virtualizing entire desktops and/or for virtualizing particular applications.

Systems for supporting software virtualization typically include banks of computing servers for hosting virtualized user sessions and control software. The control software performs numerous functions, such as providing user management, creating and destroying user sessions, and managing power.

Power management functions for software virtualization systems may include powering off computing servers that are not needed for satisfying user demand. For example, if each computing server can run thirty virtualized user sessions and a total of fifty virtualized user sessions are currently needed, all but two computing servers available for running virtualized user sessions may be shut down. Some power management features allow system administrators to manually enter schedules for session capacity. Such schedules may require that certain minimum numbers of virtualized user sessions be kept available from running computing servers at various times of day, whether they are used or not. In this manner, some minimum number of servers is always running and available to satisfy user demand.

SUMMARY

Unfortunately, system administrators cannot always accurately predict user demand for virtualized user sessions. The schedules specifying minimum numbers of virtualized sessions thus tend either to overprovision user sessions or to underprovision them. Overprovisioning user sessions can waste power and cost by running computing servers unnecessarily, whereas underprovisioning can cause a system to run out of available session capacity, such that users may suffer long delays while they wait for computing servers to be powered, booted, and made available for use. In certain cloud-based systems, several minutes or more may be needed to start each computing server. In addition, requiring system administrators to predict virtualized session demand places additional burdens on administrators, whose time is limited.

In contrast with the prior approach, in which administrators manually enter schedules of expected virtualized session demand, an improved technique for managing virtualized user sessions in an electronic system generates schedules of expected session usage adaptively, based on actual numbers of user sessions allocated while operating the electronic system, and provides capacity for running user sessions from powered-on servers ready to accept new user sessions. The electronic system allocates user sessions in response to requests and tracks numbers of allocated user sessions. As schedules of expected session usage are adjusted based on actual session usage, schedules tend to become more accurate over time and can adapt to changes in usage patterns. Thus, the improved technique helps to reduce the effects of overprovisioning and underprovisioning, which are common to the prior manual approach, and also helps to relieve system administrators from the burdens of having to manually enter schedules of expected session usage.

Certain embodiments are directed to a method of managing virtualized user sessions in an electronic system that provides virtualized session hosting services. The method includes maintaining a pool of virtualized session capacity available from powered-on compute servers in the electronic system. The pool of virtualized session capacity has a size that varies in response to (i) demand for user sessions and (ii) a schedule. The schedule establishes, for each of multiple time intervals extending over a predetermined period of time, a respective minimum session capacity to be kept available during that time interval. The method further includes allocating user sessions from the pool in response to requests for user sessions and monitoring, over multiple instances of the predetermined period of time, a number of allocated user sessions during each of the multiple time intervals to generate session usage data for each of the multiple time intervals. The method still further includes adjusting the schedule based on the session usage data.

Other embodiments are directed to an electronic system constructed and arranged to perform a method of managing virtualized user sessions, such as described above. Still other embodiments are directed to a computer program product. The computer program product stores instructions which, when executed by a control server of an electronic system, cause the control server to perform a method of managing virtualized user sessions, such as described above. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for managing virtualized user sessions in an electronic system generates schedules of expected session usage adaptively, based on actual numbers of user sessions allocated while operating the electronic system, and provides capacity for running user sessions from powered-on servers ready to accept new user sessions.

Figure 1:
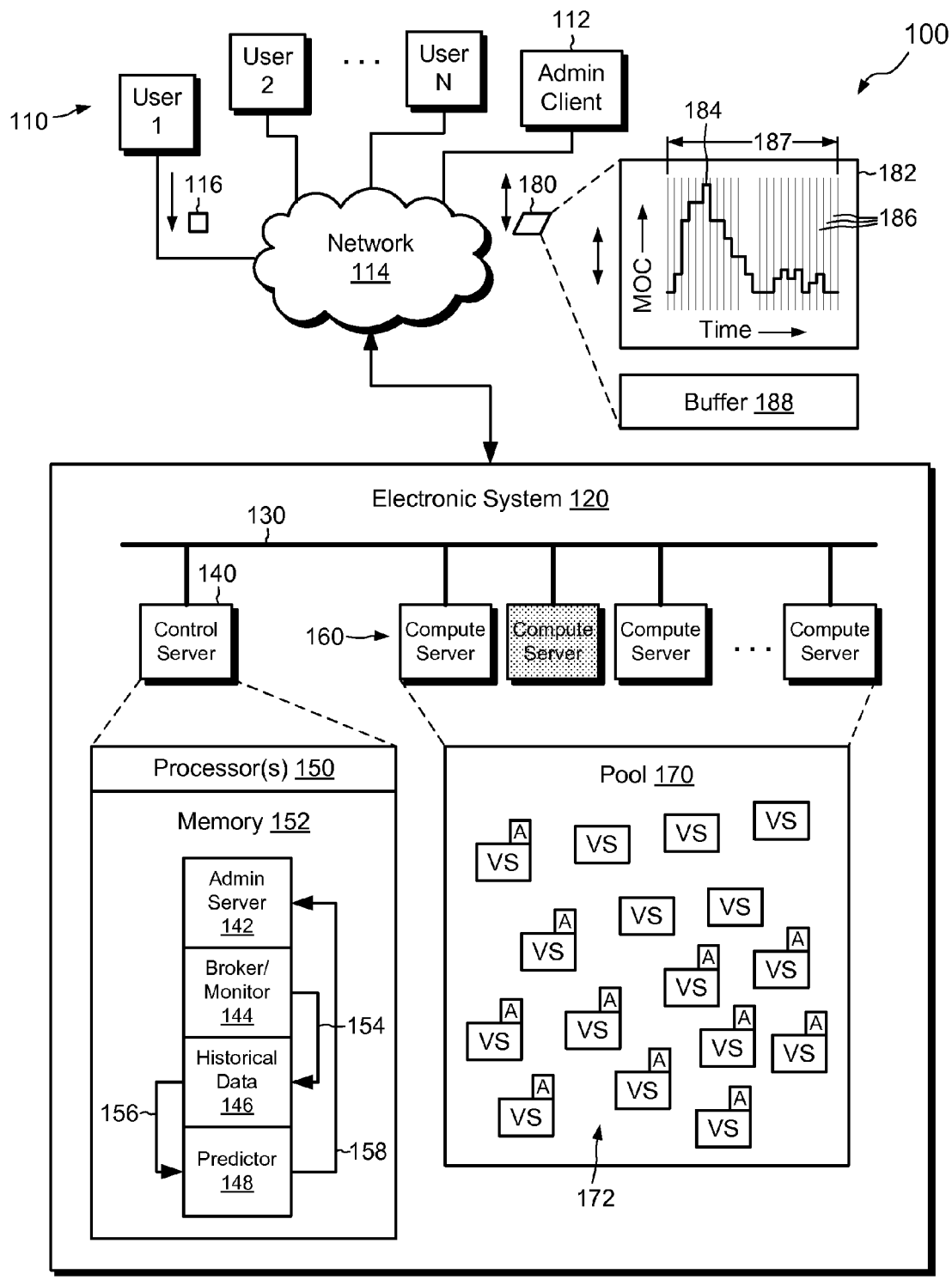
FIG. 1 is a block diagram of an example environment in which embodiments of the improved technique hereof can be practiced.

FIG. 1 shows an example environment 100 in which embodiments of the improved technique hereof can be practiced. Here, multiple user machines 110 and an administrative client machine 112 connect over a network 114 to an electronic system 120. The network 114 can be any type of network or combination of networks, such as a local area network (LAN), a wide area network (WAN), the Internet, and/or some other type of network or combination of networks, for example. The electronic system 120 includes a control server 140 and multiple compute servers 160. In an example, the control server 140 and each of the compute servers 160 are interconnected by LAN 130. The control server 140 includes a set of processors 150 and memory 152. The set of processors 150 includes one or more processing chips and/or assemblies. The memory 152 includes both volatile memory (e.g., RAM), and non-volatile memory, such as one or more ROMs, disk drives, solid state drives, and the like. The set of processors 150 and the memory 152 together form control circuitry, which is constructed and arranged to carry out various methods and functions as described herein. Also, the memory 152 includes a variety of software constructs realized in the form of executable instructions. When the executable instructions are run by the set of processors 150, the set of processors 150 are caused to carry out the operations defined by the software constructs. Although certain software constructs are specifically shown and described, it is understood that the memory 152 typically includes many other software constructs, which are not shown, such as an operating system, various applications, processes, and daemons. Further, it should be understood that the control server 140 may include additional components, such as one or more network interfaces, busses, coprocessors, chipsets, and the like; however, these are omitted from the figure for the sake of simplicity.

In an example, each of the compute servers 160 is configured to run multiple virtualized user sessions, which may be provided, for example, in respective containers running on a common operating system kernel. Each virtualized user session provides a respective userspace instance, in which a virtualized desktop or virtualized application may be run. Example software for supporting virtualized user sessions includes Windows Server, available for Microsoft Corporation of Redmond, Wash., and XenApp, available from Citrix Systems Inc. of Fort Lauderdale, Fla. Other solutions for supporting user sessions are available for use with the Linux operating system.

In a typical arrangement, each of the compute servers 160 has a nominal capacity, which indicates the number of virtualized user sessions that the compute server 160 is capable of supporting at a time (e.g., 30, 40, etc.). To manage power and cost in the electronic system 120, any of the compute servers 160 may be powered off if it is not needed (see shaded compute server 160), or it may be powered on and available for use (i.e., booted with the software for supporting virtualized user sessions running) Together, the compute servers 160 that are powered on and available provide a pool 170 of virtualized session capacity. The pool 170 is a logical structure that aggregates nominal capacity for virtual sessions (VS's) 172 across all running and available compute servers 160. It can be seen that the pool 170 has a size, which provides the number of virtualized sessions 172 available in the pool 170, and that some virtualized sessions are allocated, as indicated by flags "A," while others are unallocated (no flags). An "allocated" virtualized session is a virtualized session that the electronic system 120 has started on a running compute server 160 and allocated to a user machine 110. An "unallocated" virtualized session represents session capacity on a powered-on and available compute server 160, but the unallocated virtualized session has not been allocated to a user machine 110 and need not actually be running Each of the compute servers 160 includes its own set of processors, memory, and so forth, which may be similar to those described above for the control server 140.

Returning to the control server 140, it is seen that the memory 152 includes, i.e., realizes by operation of executable instructions and data, multiple software constructs. These include an administrative server 142, a broker/monitor 144, historical data 146, and a predictor 148.

The administrative server 142 works in connection with the administrative client 112 to allow a system administrator running the administrative client 112 to configure and manage the electronic system 120. For example, the administrative server 142 may serve a graphical user interface (GUI) and/or a command line interface (CLI) to administrative client 112, which enables the system administrator to interact with the administrative server 142, e.g., to enter settings, initiate activities, view results, and so forth. Although the administrative client 112 is seen to connect to the electronic system 120 over the network 114, this is merely an example, as the administrative client 112 may alternatively be provided within the electronic system 120, e.g., as a computer or virtual machine having access to the LAN 130.

In the example shown, the broker/monitor 144 performs numerous roles. For instance, the broker/monitor 144 manages user accounts, connects user machines 110 with virtualized user sessions 172, and coordinates with software running on compute servers 160 to create and destroy virtualized user sessions 172. The broker/monitor 144 also controls operation of compute servers 160 to power them on and off. In addition, the broker/monitor 144 monitors activities and conditions within the electronic system 120. For example, the broker/monitor 144 has an API (application programming interface) that provides, upon request, the size of the pool 170 and an allocated session count (ASC). The ASC provides the number of allocated virtualized user sessions 172 in the pool 170. In some examples, the broker/monitor 144 also provides performance data, such as the amount of time needed to compute servers 160 to bring them to an operational state, the amount of time needed to start virtualized user sessions, and so forth.

The historical data 146 is a database that stores a variety of data pertaining to operation of the electronic system 120, such as monitored outputs from the broker/monitor 144 (described above), user activities, environmental factors, set points for maintaining virtualized user sessions, and so forth. In an example, the historical data 146 is accumulated over time and can reflect system, user, and environmental factors over any desired time scale.

The predictor 148 accesses the historical data 146 and predicts revised set points for the electronic system 120. Such revised set points are based on the historical data 146 and thus can provide accurate predictions based on past performance.

It should be understood that the particular structural arrangement of elements shown in FIG. 1 is intended merely to be illustrative. For example, although the administrative server 142, broker/monitor 144, historical data 146, and predictor 148 are seen to operate together on a single control server 140, they may alternatively be provided on different servers. In some examples, these software constructs may be provided on one or more virtual machines. The virtual machines may run on one or more dedicated physical servers, or on physical servers that also host virtualized user sessions 172. The arrangement shown is thus provided merely as an example and is not intended to be limiting.

In example operation, the electronic system 120 provides software virtualization services for user machines 110. For example, users of machines 110 can log on to the electronic system 120 and operate virtualized user sessions 172 hosted thereon. Using virtualization technology, a virtualized user session 172 may appear as a complete desktop running on the user machine 110, e.g., with its own user account and applications, even though the electronic system 120 hosting the virtualized user session 172 is remote from the user machine 110. Alternatively, a virtualized user session 172 may appear as a software application that runs locally to the user but actually runs within the electronic system 120.

The electronic system 120 provisions virtualized session capacity to the pool 170 in accordance with set points 180. For example, a schedule set point 182 establishes, for each of multiple time intervals 186 extending over a predetermined period of time 187, a respective minimum capacity of virtualized user sessions (minimum online capacity, or "MOC" 184) to be available (i.e., on running, booted compute servers 160) during that interval 186. In an example, the intervals 186 may represent hours of the day and the period 187 may represent a day (24 hours). It can be seen from the schedule 182 that MOC 184 varies from hour to hour over the course of the day. In setting forth minimum capacity for virtualized user sessions 172, the schedule 182 establishes a baseline capacity, which the pool 170 must meet or exceed during the respective time intervals.

Although the time intervals 186 in the example shown are hours and the period 187 is a day, other measures of time may be used, such as minutes in an hour, minutes in a day, days in a week, weeks in a month, months in a year, and so forth. Also, multiple schedules 182 may be provided, such as a different schedule for each day of the week and schedules for particular holidays, for example.

In an example, the schedule 182 is a first of multiple set points 180 that control provisioning of session capacity. For instance, the electronic system 120 may support a second set point defining a buffer 188. The buffer 188 provides a safety margin of session capacity to be provisioned to the pool 170 in excess of the current allocated sessions count (ASC). Thus, in cases where ASC approaches or exceeds MOC, e.g., in response to unexpected user demand, the pool 170 can maintain a safety margin of available session capacity in the event that yet further requests for virtualized user sessions 172 are received. As previously indicated, compute servers 160 can require several minutes or more to start. The buffer 188 thus provides a reserve of session capacity on running compute servers 160 to satisfy any user requests for virtualized user sessions that arrive without having to keep users waiting for compute servers 160 to be started. In some examples, buffer 188 is expressed as a number of virtualized user sessions. In other examples, buffer 188 is expressed as a percentage of current capacity, or in some other way. When buffer 188 is provided as a second set point, the electronic system 120 may operate to ensure that both the set point for the schedule 182 and the set point for the buffer 188 are satisfied.

Initial settings of set points 180 (schedule 182 and buffer 188) may be established in any suitable way. In some examples, the electronic system 120 establishes initial set point values based on what is typical for most scenarios. In other examples, maximum values are selected, such that the electronic system 120 initially powers on, boots and initializes all compute servers 160. In further examples, initial values of set points 180 may be provided by the system administrator.

As the electronic system 120 operates, the broker/monitor 144 monitors system activities and conditions to generate monitored values 154. The monitored values 154 include, for example, the current set points, the current allocated session count (ASC), and other values, such as monitored compute server turn-on times and monitored virtualized session start times. The historical data 146 stores the monitored values 154, along with corresponding timestamps, and accumulates monitored values 154 over each of the time intervals 186 (e.g., hours, minutes, etc.) and over multiple periods 187 (e.g., hours, days, etc.). The predictor 148 obtains data 156, which includes some or all of the monitored values 154 accumulated over multiple time periods 187. The predictor 148 then applies machine learning techniques to make predictions 158 of revised set point values 180 (e.g., schedule 182 and/or buffer 188). The administrative server 142 receives the predictions 158 and adjusts the set point values 180 to those prescribed in the predictions 158 to control provisioning of capacity to the pool 170. In this manner, the electronic system 120 adjusts the set point values 180 for the schedule 182 and/or buffer 188 based on actual system behavior. As the electronic system 120 continues to operate, the predictor 148 continues to make new predictions 158 based on newly monitored values 154, such that predictions continue to improve. Also, as patterns of user demand for virtualized sessions change over time, the electronic system 120 adapts automatically to the changes in demand.

In some examples, the electronic system 120 may request input from the system administrator when revising set point values 180. For example, the administrative server 142 may receive predictions 158 and present revised set points 180 to the administrator via the administrative client 112. The administrator may operate the GUI and/or CLI to provide input indicating whether the administrator accepts or rejects the revised set points 180. If the administrator accepts the revised set points 180, the electronic system 120 may proceed to provision session capacity in accordance with the revised set points 180. However, if the administrator rejects the revised set points 180, the electronic system 120 may prompt the user to manually enter new set points. The electronic system 120 may then proceed to provision session capacity in accordance with the manually-entered set points. As yet another option, the electronic system 120 may prompt the administrator to modify the revised set points 180, e.g., by manually adjusting certain automatically-generated values of MOC 184 up or down, as desired.

Although the electronic system 120 may accept administrator input in some examples, it can be seen that the operation described above may also act independently of administrator input or with minimal administrator input. Also, as the predictor 148 applies machine learning to produce accurate set points and to adjust set points in response to changes in system behavior, the likelihood that capacity will be overprovisioned or underprovisioned may be greatly reduced as compared with the prior manual approach.

Figure 2:
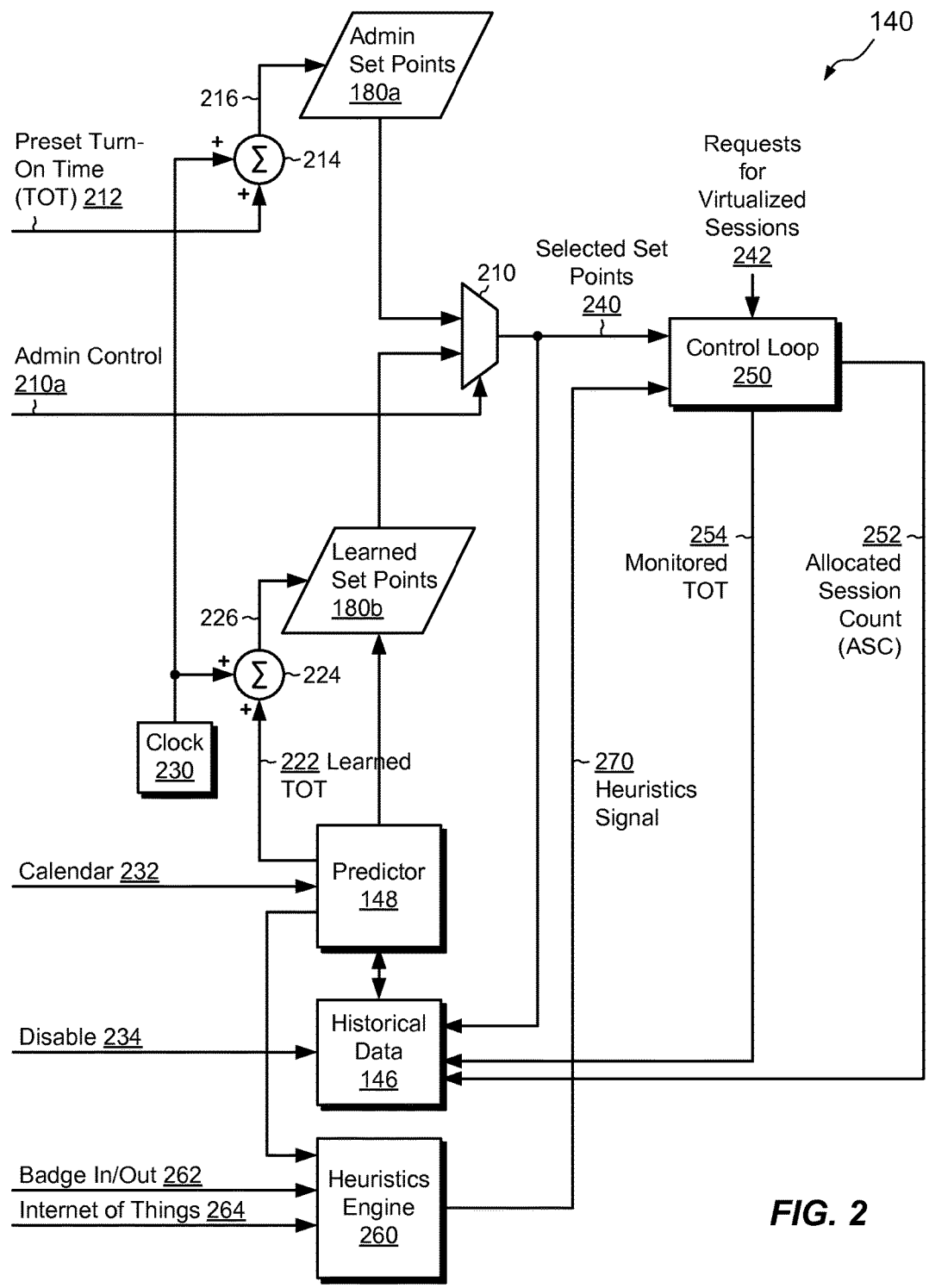
FIG. 2 is a block diagram of an example control server of FIG. 1 in additional detail.

FIG. 2 shows example features of the control server 140 in additional detail. Here, a selector 210 provides selected set points 240 (e.g., a schedule 182 and buffer 188) to a control loop 250. In this example, the selected set points 240 convey either administrator-provided set points 180*a* or learned, automatically generated set points 180*b*, e.g., depending on whether the administrator rejects or accepts, respectively, learned set point values.

In an example, set point values are advanced in time to account for potentially lengthy turn-on times (TOTs) of compute servers 160. For example, MOC values 184 designated for respective time intervals 186 are applied to the control loop 250 prior to the times when the respective time intervals 186 begin. Advancing the schedule 182 in this fashion gives compute servers 160 enough time to be configured and booted, such that they are available for use when the beginnings of respective time intervals 186 arrive. In the example shown, a summer 214 adds a preset TOT 212 (e.g., 15 minutes or some other suitable value) to a current time specified by clock 230 to produce a time index 216 into the set points 180*a*. Similarly, a summer 224 adds a learned TOT 222 (e.g., generated by the predictor 148) to the current time to produce a time index 226 into the learned set points 180*b*.

The control loop 250 receives the selected set points 240 (e.g., a selected schedule 182 and buffer 188) and controls provisioning of capacity to the pool 170 (FIG. 1) to satisfy the selected set points 240. As the control loop 250 operates, requests 242 for virtualized user sessions arrive. In response to the requests 242, the electronic system 120 allocates virtualized user sessions to satisfy the requests 242, e.g., by starting the sessions and tracking their status as allocated. Just as the new virtualized user sessions 172 may be allocated, others may be de-allocated, e.g., in response to users logging off of their sessions. Demand for virtualized user sessions can thus both increase and decrease over time.

While the control loop 250 operates, the broker/monitor 144, which runs within the control loop 250, generates live data indicating allocated session count (ASC) 252 and, in some cases, monitored TOT 254. The ASC 252 and monitored TOT 254 are stored in historical data 146, along with selected set points 240, where they inform the predictor 148 in generating updated values for learned TOT 222 and learned set points 180*b*. In some examples, the broker/monitor 144 also monitors start time for virtualized user sessions and the predictor 148 takes these start times into account when generating predictions.

As further shown in FIG. 2, predictor 148 may receive calendar input 232. In generating learned TOT 222 and learned set points 180*b*, the predictor 148 may refer to the current day and date from the calendar input 232 and may generate predictions accordingly, e.g., based on whether the current day is a workday, weekend day, holiday, and so forth.

Still further shown in FIG. 2 is heuristics engine 260. Heuristics engine 260 generates a heuristics signal 270, which enables the control loop 250 to respond to immediate environmental circumstances correlated with usage of virtualized user sessions 172, which circumstances may have an effect on session usage but which are not accounted for in the historical data 146. In some examples, the heuristics engine 260 generates the heuristics signal 270 with reference to current predictions, such that the heuristics signal 270 is asserted only when immediate circumstances fall outside the range of predicted behavior. The heuristics signal 270 may be based on a variety of factors. One such factor may include badging activities 262 of workers checking in or out of a building for which the electronic system 120 provides service. For example, if many workers arrive at the building at an unusual time, such as on a Saturday morning, the heuristics signal 270 can inform the control loop 250 of a large surge of unexpected demand, to which the control loop 250 can respond by provisioning additional capacity. By monitoring activities of workers when they badge into a building, the control loop 250 generally has time to respond to an unpredicted surge in demand for capacity before workers are settled and ready to log on to the electronic system 120. Other factors may include input from Internet-of-Things devices 264, as well as current and previous predictions. In some examples, only positive values of the heuristics signal 270 are input to the control loop 250, thus allowing immediate circumstances to increase capacity but prohibiting them from decreasing capacity. In some examples, the historical data 146 stores heuristics signal 270, which may then be used to inform future predictions.

In some examples, a disable signal 234 selectively directs the historical data 146 to stop recording. For instance, a strong heuristics signal 270 may indicate unusual circumstances that are unlikely to repeat. When a strong heuristic signal 270 is asserted, the recording of historical data 146 may be disabled to prevent the predictor 148 from biasing subsequent predictions based on the unusual circumstances. In addition, system administrators or software processes may disable recording of historical data 146 whenever it is desired to prevent current circumstances from affecting future predictions.

Figure 3:
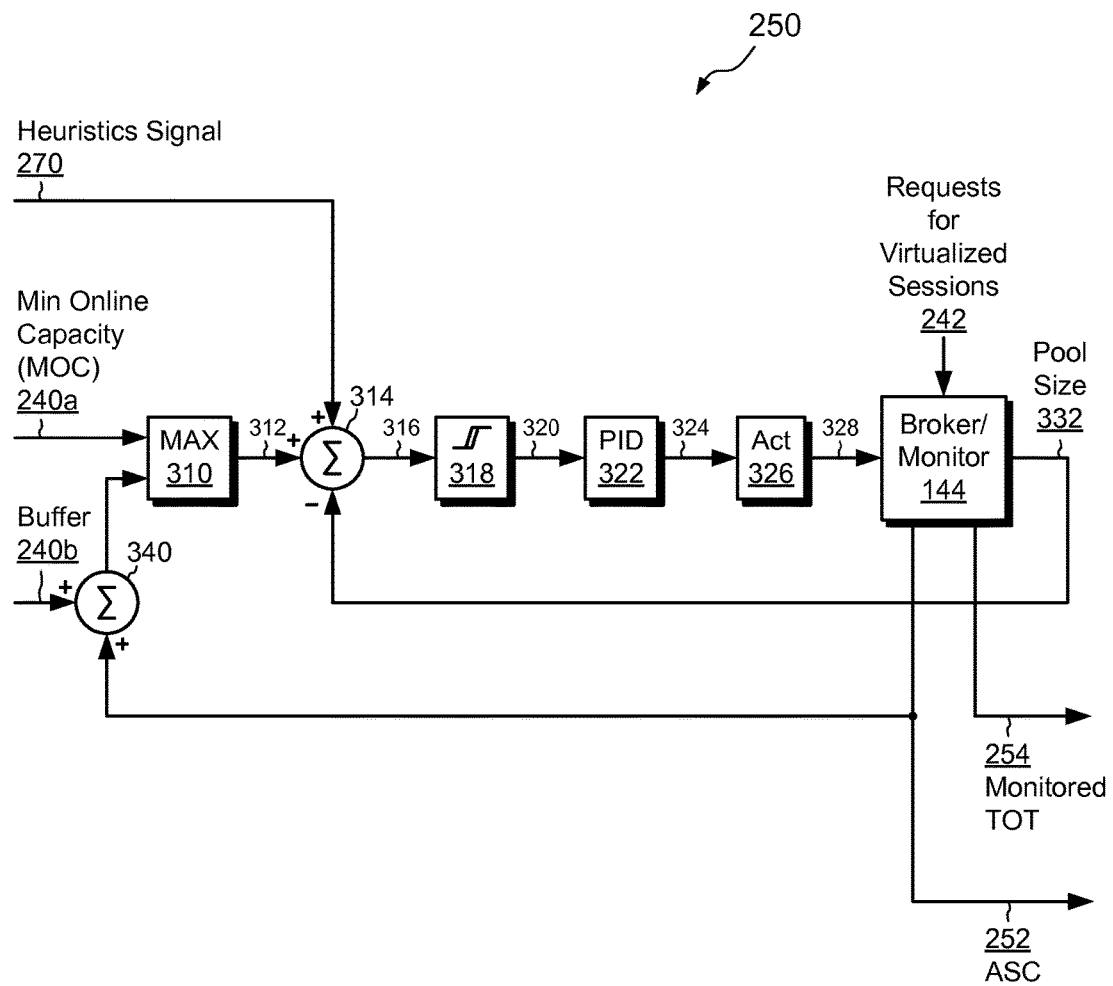
FIG. 3 is a block diagram of an example control loop operated by the control server of FIG. 2.

FIG. 3 shows features of the control loop 250 in additional detail. Here, a summer 314 generates an error signal 316 proportional to a difference between a current set point value 312 and a feedback value 332. The set point value 312 is computed as a maximum (via MAX block 310) of a current value of MOC (240*a*) and a sum (via summer 340) of the value of the buffer 240*b* and the current allocated session count (ASC) 252. Thus, the current set point value 312 equals the MOC value 240*a* from the selected set points 240, when MOC exceeds the sum of buffer 240*b* and ASC 252, but equals the sum of buffer 240*b* and ASC 252 otherwise. The control loop 250 tends to drive the error signal 316 to zero, thus tending to drive the current pool size 332 to the current MOC 240*a* or the current sum of ASC 252 and buffer 240*b*, whichever is greater. In this fashion, both set points 240*a* and 240*b* are always satisfied, i.e., the pool size 332 is always large enough to meet MOC and to always have a buffer 240*b* of additional capacity above and beyond the number of allocated sessions (ASC) 252. In this manner, the control loop 250 can be regarded as operating in a first mode, in which it acts to ensure that the current MOC 240*a* as defined by schedule 182 is satisfied, or in a second mode, in which it acts to ensure that the current buffer 240*b* is maintained above the current ASC 252.

Within the control loop 250, actuator 326 issues power commands 328 to direct the broker/monitor 144 to turn on compute servers 160 and/or to take compute servers 160 out of maintenance mode, e.g., when more capacity is needed, or to turn off compute servers 160 and/or to place them in maintenance mode, e.g., when less capacity is needed. Placing a compute server 160 in maintenance mode causes that server to refuse requests to start new virtualized user sessions and allows user sessions running on that server to drain over time, i.e., as users complete their sessions and log off. Placing a compute server 160 in maintenance mode also causes any remaining capacity on that server (e.g., that server's nominal capacity minus the current number of sessions it hosts) to be excluded from the pool size 332, such that its remaining capacity is no longer counted. Taking a compute server 160 out of maintenance mode, however, allows that server to accept requests for new user sessions and causes any remaining capacity on that server to be included in the pool size 332, such that the remaining capacity of that server is counted.

In some examples, control loop 250 includes hysteresis 318. For example, hysteresis 318 receives the error signal 316 and generates a modified error signal 320. The modified error signal 320 follows the error signal 316 when the error signal 316 is rising and when the error signal 316 is falling, but it does not follow the error signal 316 during rising/falling and falling/rising transitions. Rather, hysteresis 318 introduces a band that the error signal 316 must cross before tracking can resume. In an example, the hysteresis band is set to approximately the nominal capacity of each computer server 160 (assuming the nominal capacities are uniform). Thus, after a period of rising, the error signal 316 is required to fall by this nominal capacity before the signal 320 begins to fall. The effect of hysteresis 318 is to provide the control loop 250 with a different threshold for turning off a compute server 160 than it uses for turning it on. As each compute server 160 may host many user sessions, small changes in demand can cause large changes in capacity. Without hysteresis 318, bringing a new compute server 160 online in response to user demand could cause the error signal 316 to switch from positive to negative, even though some of the capacity of the new compute server is needed. Hysteresis 318 therefore prevents chattering of the feedback and consequent wasteful activities of stopping and starting compute servers 160.

In some examples, a PID controller 322 receives the modified error signal 320 and drives the actuator 326. The PID controller 322 includes proportional (P), integral (I), and/or derivative (D) terms, each of which has a weight, with the weighted terms being summed to generate a control signal 324. Although optional in cases where it is not needed for stability, the PID controller 322 can be used to adjust dynamics of the control loop 250. Example values for gain terms, $K_P$, $K_I$, and $K_D$, of approximately, 0.9, 0.1, and 0.1, respectively, have been show to yield stable and satisfactory results.

As further shown in FIG. 3, the summer 314 adds heuristics signal 270 to the selected set point 312 as additional input to the control loop 250. Thus, when the heuristics signal 270 indicates unexpected demand for new user sessions, summer 314 effectively adds this demand to error signal 316, which causes the control loop 250 to increase the capacity of the pool 170 to accommodate the increase in demand.

Figure 4:
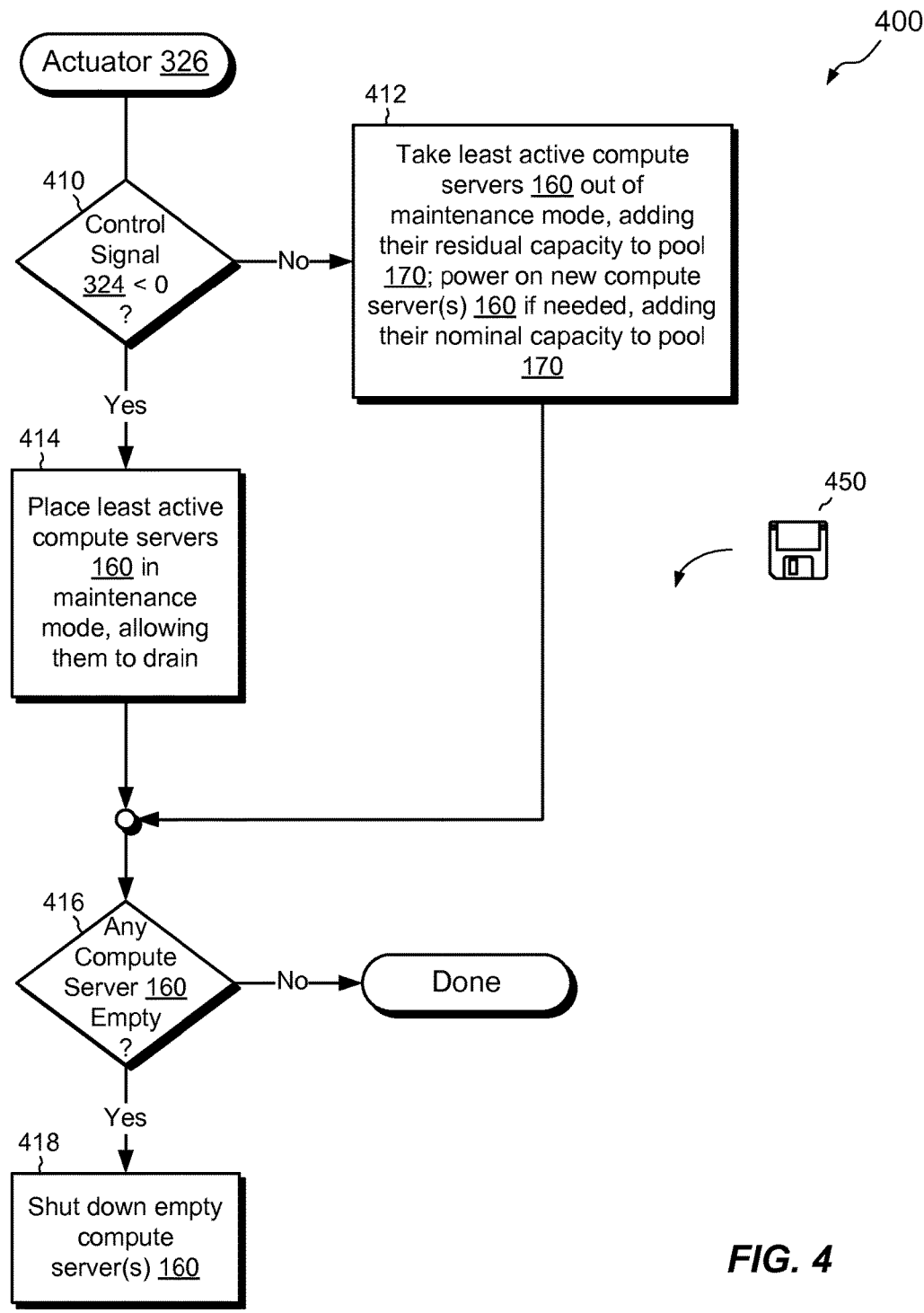
FIG. 4 is a flowchart showing an example process performed by an actuator in the control loop of FIG. 3.

FIG. 4 shows an example process 400 performed by the actuator 326 within control loop 250. The process 400 is performed, for example, by instructions stored in the memory 152 of the control server 140, which are executed by the set of processors 150. In an example, the actuator 326 performs the process 400 at discrete times and on a regular basis, such as once per minute, or at any other suitable frequency.

At 410, the actuator 326 tests control signal 324 to determine whether it is positive or negative. A positive value of control signal 324 indicates that more capacity is needed to meet the current set point 312 (FIG. 3) and heuristics signal 270, if asserted, whereas a negative value of control signal 324 indicates that less capacity is needed.

If the control signal 324 is positive, operation proceeds to 412, whereupon capacity is added. In an example, the actuator 326 checks compute servers 160 that are currently in maintenance mode and ranks them in ascending order of remaining capacity (nominal capacity minus session count on the respective server). Compute servers 160 with the least remaining capacity are taken out of maintenance mode first, such that their remaining capacity is added to the pool size 332. This activity continues on additional compute servers 160, until enough remaining capacity is added back to the pool 170 to satisfy the control signal 324 (e.g., to add all the capacity that was lacking) Adding capacity from compute servers in ascending order of remaining capacity tends to fully utilize compute servers 160 and thus tends to minimize the number of compute servers 160 that are powered on. If the control signal 324 is positive and no compute servers 160 are currently in maintenance mode, currently-off compute servers 160 may be powered on and booted, with their nominal capacity added to the pool 170. Powering on servers may continue until the shortfall indicated by the control signal 324 is fully addressed.

If the control signal 324 is negative, however, operation proceeds to 414, whereupon capacity is reduced. In an example, compute servers 160 are ranked in descending order of remaining capacity and placed in maintenance mode in the ranked order, until the remaining capacity of the servers placed in maintenance mode addresses the value of the control signal 324. Placing compute servers 160 in maintenance mode in descending order of remaining capacity accelerates the process of emptying inactive compute servers 160. Compute servers 160 placed in maintenance mode are allowed to drain over time.

At 416, the actuator 326 checks whether any compute servers 160 are empty, i.e., if any of them is hosting no virtualized user sessions. Act 416 may be performed regardless of whether the control signal 324 is positive or negative. At 418, any empty compute servers 160 are shut down, thus conserving power.

Figure 5:
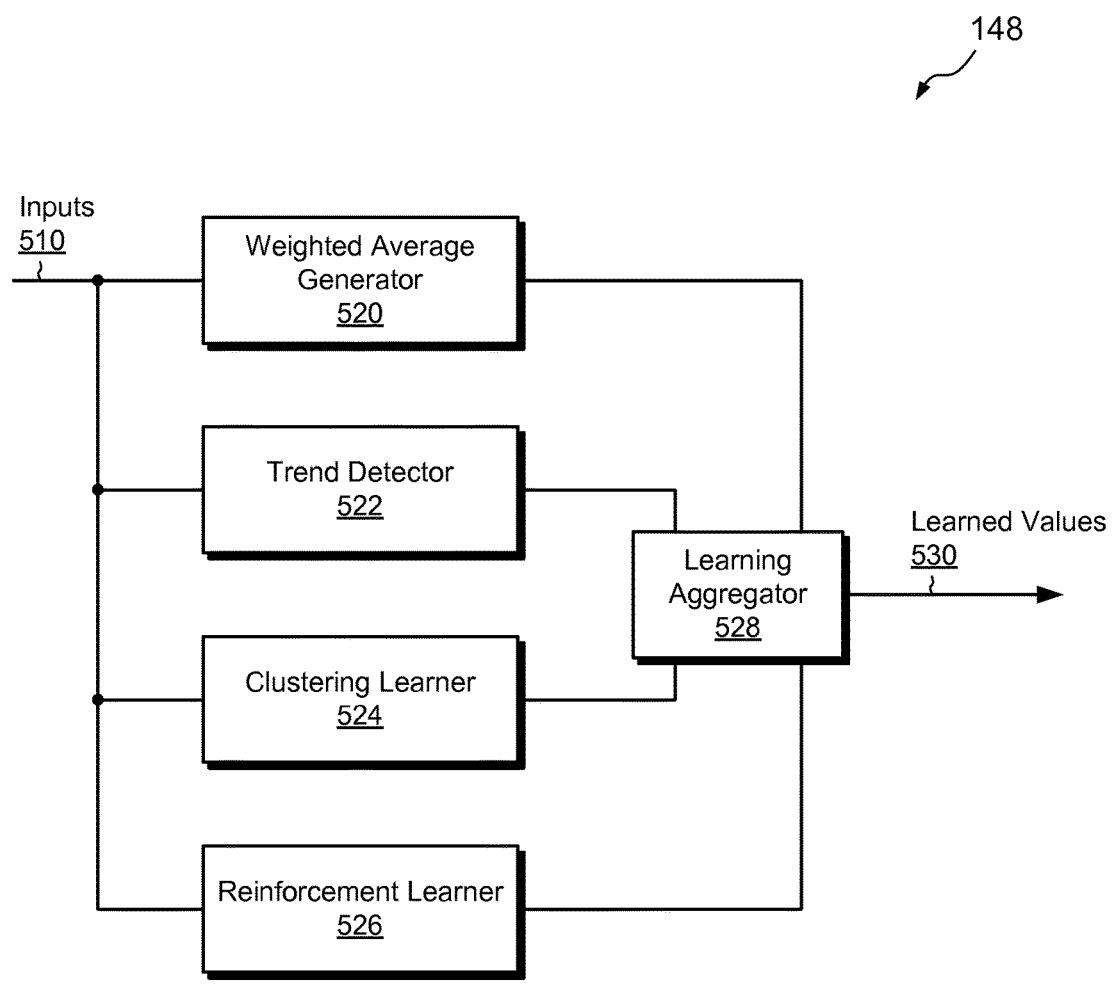
FIG. 5 is a block diagram showing example machine learning features that may be employed by a machine learning predictor of FIG. 2.

FIG. 5 shows example features of the predictor 148 in additional detail. As previously indicated, the predictor 148 receives input from historical data 146 and generates predictions in response thereto. In general, the historical data 146 accumulates values of allocated session count (ASC) 252 over multiple periods 187 of time (e.g., over multiple days), where each period 187 includes multiple time intervals 186 (e.g., hours; FIG. 1). In response to the accumulated historical data 146, the predictor 158 performs machine learning activities to generate learned set points 180b. The learned set points 180b may include learned values of MOC (Minimum Online Capacity) 184 for the respective time intervals 186 (e.g., one MOC value per time interval 186) and learned values for the buffer 188. In some examples, learned values of the buffer 188 may be provided on a per-time-interval 186 basis. In other examples, values of the buffer 188 do not vary much between time intervals, such that a single learned value of the buffer 188 may be provided for all time intervals 186. In addition, the historical data 146 may accumulate monitored values 254 of turn-on time (TOT) for compute servers 160 (and also start time of user sessions, in some cases) and the predictor 148 may generate learned values 222 of TOT. In a similar manner, the historical data 146 may accumulate other operating conditions and performance characteristics of the electronic system 120 and the predictor 148 may generate respective learned values to further adjust and refine system operation.

As shown in FIG. 5, the predictor 148 receives inputs 510, such as allocated session count (ASC) 252 and monitored TOT 245, and generates learned values 530, such as learned set points 180b and learned TOT 222, in response thereto. The predictor 148 may employ any suitable machine learning techniques, such as unsupervised learning, supervised learning, or reinforcement learning, for example.

In the example shown, weighted average generator 520 computes separate weighted averages of MOC for each time interval 186 based on monitored values of ASC 252 over the respective intervals 186. For example, weighted average generator 520 generates a weighted average of MOC for the time interval 186 extending from 1 PM to 2 PM based on monitored ASC 252 values for the same time interval 186 on previous days. Similar averaging may be done for other time intervals 186. The weighted averaging may apply weights that diminish with age, such that older monitored values are given less weight than are more recent ones. In an example, weights diminish over time according to exponential decay, although this is not required. In some examples, the weighted average generator 520 computes moving averages over a predetermined window of samples.

Trend detector 522 analyzes recent trends in monitored values and extrapolates those trends in generating learned values. For example, if monitored ASC values 252 show a recent increasing trend, e.g., over the last 5 minutes, 10 minutes, etc., the trend detector 522 may extrapolate that trend in generating learned MOC values. Curve fitting, time-series analysis, and related techniques may be applied in detecting trends and extrapolating predicted values.

Clustering learner 524 applies unsupervised learning techniques, where training data is not labeled. In an example, clustered learner 524 categorizes monitored values into days of the week without receiving calendar input 232 (FIG. 2), e.g., based on different values of data monitored over different days.

Reinforcement learner 526 applies reinforcement learning techniques, where power actions 328 (FIG. 3) are assigned rewards and/or punishments based on outcomes, with outcomes judged based on whether the power actions 328 yield pool sizes 332 (FIG. 3) that are larger than needed, smaller than needed, or appropriate for the actual resulting demand.

Learning aggregator 528 receives predictions from weighted average generator 520, trend detector 522, clustering learning 524, and reinforcement learner 526 and combines them to generated learned values 530. The learning aggregator 528 may combine its inputs in any suitable way to generate its output, such as by addition, weighted averaging, application of rules, or other suitable ways.

In an example, predictor 148 is programmed to adjust MOC values 184 and buffer values 188 separately. For example, buffer incursions (i.e., instances when the buffer 188 is required to satisfy demand virtualized user sessions) may indicate either that MOC 184 is too small or that the buffer 188 is too small. In an example, reinforcement learner 526 preferentially increases MOC 184 rather than buffer 188 when buffer incursions are consistent and/or slow to change, but preferentially increases the buffer 188 rather than MOC 184 when buffer incursions are inconsistent and/or occur in high amplitude spikes. In an example, the control loop 250 detects buffer incursions as increases in control signal 324 when the control loop 250 is operating in the second mode.

Figure 6:
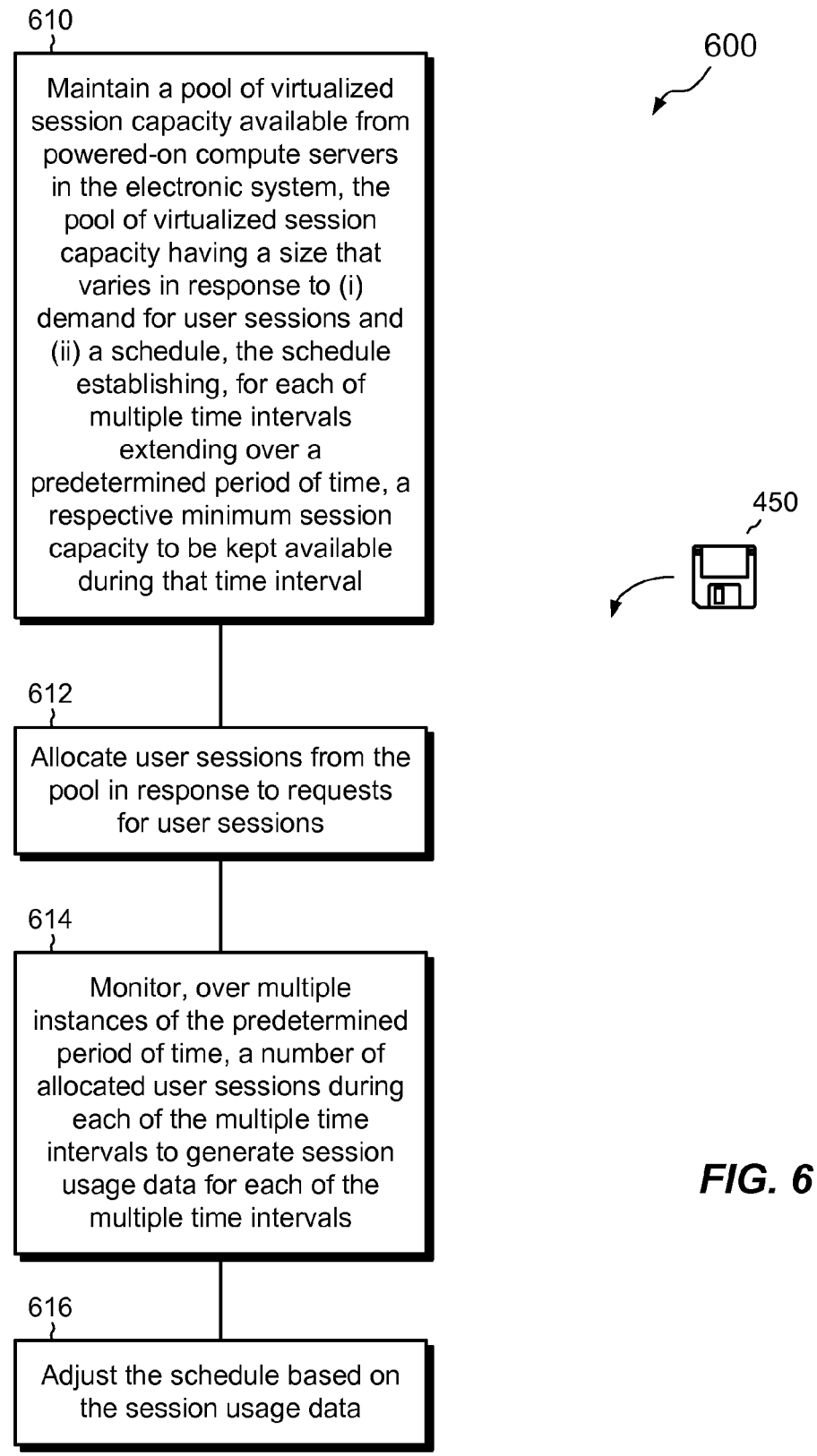
FIG. 6 is a flowchart showing an example method of managing virtualized user sessions in an electronic system.

FIG. 6 shows a process 600 that may be carried out in connection with the electronic system 120. The process 600 is typically performed by the software constructs, described in connection with FIG. 1, which reside in the memory 152 of the control server 140 and are run by the set of processors 150. The various acts of the process 600 may be ordered in any suitable way. Accordingly, embodiments may be constructed in which acts are performed in orders different from that illustrated, which may include performing some acts simultaneously, even though the acts are shown as sequential in the illustrated embodiments.

At 610, a pool is maintained of virtualized session capacity available from powered-on compute servers in the electronic system. The pool of virtualized session capacity has a size that varies in response to (i) demand for user sessions and (ii) a schedule. The schedule establishes, for each of multiple time intervals extending over a predetermined period of time, a respective minimum session capacity to be kept available during that time interval. For example, the electronic system 120 maintains a pool 170 of virtualized session capacity 172 (FIG. 1). The pool 170 has a size 332 (FIG. 3) that is made to vary in response to requests 242 for virtualized user sessions and in response to a schedule 182 (FIG. 1). The schedule 182 establishes a respective MOC (Minimum Online Capacity) value 184 for each of multiple time intervals 186 (e.g., hours or minutes) over a predetermined period 187 (e.g., a day).

At 612, user sessions are allocated from the pool in response to requests for user sessions. For example, the electronic system 120 allocates virtualized user sessions 172 (as indicated by flags labeled "A" in FIG. 1) by starting the user sessions and tracking their allocation status in response to requests 242.

At 614, a number of allocated user sessions are monitored during each of the multiple time intervals and over multiple instances of the predetermined period of time to generate session usage data for each of the multiple time intervals. For example, broker/monitor 144 monitors allocated virtualized user sessions and generates an allocated session count (ASC) 252, which may be updated on a regular basis, such as once per minute. Historical data 146 accumulates the ASC values 252 over multiple days (or other time periods) and stores the values with associated timestamps. The ASC values 252 are sorted according to time interval 186 and applied, via predictor 148, to generate respective learned values of MOC on a per-interval basis.

At 616, the schedule is adjusted base on the session usage data. For example, the learned values of MOC are provided in a revised schedule (e.g., learned set points 180b). The learned set points 180b may then selectively be applied to the control loop 250 (FIG. 2).

Having described certain embodiments, numerous alternative embodiments or variations can be made. For example, although certain type of data, such as ASC 252 and monitored TOT 254, have been specifically described as monitored values, it should be understood that data relating to other system conditions and performance characteristics may be collected and used as bases for generating learned set points 180b. Thus, the particular types of data collected are not intended to be limiting. Also, although particular machine learning techniques have been described, these are provided for illustrative purposes and the invention hereof is not limited to these techniques.

Further, although the improved technique has been presented in connection with virtualized user sessions, described as virtualized userspace instances for desktop and/or application virtualization, the invention can also be applied to virtual machines. Thus, a virtualized user session may be regarded as a virtual machine, with each of the compute servers 160 capable of hosting multiple virtual machines.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 450 in FIGS. 4 and 6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing virtualized user sessions in an electronic system that provides virtualized session hosting services, the method comprising:
    maintaining a pool of virtualized session capacity available from powered-on compute servers in the electronic system, the pool of virtualized session capacity having a size that varies in response to (i) demand for user sessions and (ii) a schedule, the schedule being initially predetermined and establishing, for each of multiple time intervals extending over a predetermined period of time, a respective minimum session capacity to be kept available during that time interval;
    allocating user sessions from the pool in response to requests for user sessions;
    monitoring, over multiple instances of the predetermined period of time, a number of allocated user sessions during each of the multiple time intervals to generate session usage data for each of the multiple time intervals;
    adjusting the schedule based on the session usage data; and
    powering on and off particular compute servers in the electronic system based on changes in at least one of the schedule and the demand for user sessions,
    wherein maintaining the pool of virtualized session capacity is performed by a control loop, the control loop having a first mode in which the control loop maintains the minimum session capacity established by the schedule and a second mode in which the control loop maintains a session capacity based on a current number of allocated user sessions,
    wherein the control loop operates in the first mode when the current number of allocated user sessions is less than the minimum session capacity specified by the schedule for the respective time interval, and
    wherein the control loop operates in the second mode when the current number of allocated user sessions exceeds the minimum session capacity specified by the schedule for the respective time interval.

2. The method of claim 1, wherein, when operating in the second mode, the control loop causes the pool to maintain a buffer of user session capacity in excess of the current number of allocated user sessions, the buffer providing a capacity of user sessions that are available from one or more powered-on compute servers in the event that new requests for user sessions are received.

3. The method of claim 2, wherein the method further comprises:
    monitoring the control loop in the second mode to identify buffer incursions, the buffer incursions being instances in which user requests for user sessions are satisfied by allocating user sessions from the buffer; and
    adjusting a size of the buffer in response to the monitored buffer incursions.

4. The method of claim 3, wherein adjusting the schedule is performed by a machine learning predictor, the machine learning predictor providing a respective prediction of a minimum session capacity for each of the multiple time intervals based on the session usage data generated for the respective time intervals.

5. The method of claim 4, wherein monitoring the control loop in the second mode to identify buffer incursions includes monitoring the control loop during each of the multiple time intervals, and wherein adjusting the size of the buffer is performed by the machine learning predictor, the machine learning predictor providing a respective prediction of the size of the buffer for each of the multiple time intervals based on the buffer incursions monitored during the respective time intervals.

6. The method of claim 4, further comprising:
    collecting heuristic data correlated with usage of user sessions within the electronic system;
    processing the heuristic data to generate a heuristic signal; and
    providing the heuristic signal as an input to the control loop, such that the size of the pool of virtualized session capacity is based in part on the heuristic signal.

7. The method of claim 6, wherein the heuristic data includes data relating to badging activities of workers badging into and/or out of a building served by the electronic system.

8. The method of claim 4, further comprising:
    monitoring turn-on times of compute servers in the electronic system to generate a representative turn-on time; and
    advancing application of the schedule, when maintaining the pool of virtualized session capacity, to establish the minimum session capacity during the multiple time intervals by an amount of time equal to the representative turn-on time.

9. The method of claim 8, wherein generating the representative turn-on time is performed by the machine learning predictor based on the monitored turn-on times.

10. The method of claim 4, further comprising:
    presenting the adjusted schedule to an administrator; and receiving input from the administrator indicating whether the adjusted schedule is accepted or rejected.

11. The method of claim 10, further comprising operating the control loop with an administrator-provided schedule when the input from the administrator indicates that the adjusted schedule is rejected.

12. The method of claim 4, further comprising presenting the adjusted schedule to an administrator and receiving input from the administrator to manually modify the adjusted schedule.

13. The method of claim 4, wherein the control loop includes hysteresis such that a threshold for powering on a compute server for hosting user sessions on the compute server exceeds a threshold for powering off the compute server.

14. An electronic system, comprising:
multiple compute servers, each compute server including a set of processors and memory, and configured to run at least one virtualized user session; and
a control server, the control server constructed and arranged to:
maintain a pool of virtualized session capacity available from powered-on ones of the compute servers, the pool of virtualized session capacity having a size that varies in response to (i) demand for user sessions and (ii) a schedule, the schedule being initially predetermined and establishing, for each of multiple time intervals extending over a predetermined period of time, a respective minimum session capacity to be kept available during that time interval;
allocate user sessions from the pool in response to requests for user sessions;
monitor, over multiple instances of the predetermined period of time, a number of allocated user sessions during each of the multiple time intervals to generate session usage data for each of the multiple time intervals; and
adjust the schedule based on the session usage data; and
power on and off particular compute servers in the electronic system based on changes in at least one of the schedule and the demand for user sessions,
wherein the control server constructed and arranged to maintain the pool of virtualized session capacity is further constructed and arranged to operate a control loop, the control loop having a first mode in which the control loop maintains the minimum session capacity established by the schedule and a second mode in which the control loop maintains a session capacity based on a current number of allocated user sessions,
wherein the control server is constructed and arranged to operate the control loop in the first mode when the current number of allocated user sessions is less than the minimum session capacity specified by the schedule for the respective time interval, and
wherein the control server is constructed and arranged to operate the control loop in the second mode when the number of allocated user sessions exceeds the minimum session capacity specified by the schedule for the respective time interval.

15. The electronic system of claim 14,
wherein, when constructed and arranged to operate in the second mode, the control server is constructed and arranged to operate the control loop to maintain a buffer of user capacity in excess of the current number of allocated user sessions, the buffer providing a capacity of user sessions that are one or more powered-on compute servers in the event that new requests for user sessions are received.

16. A computer program product including a set of non-transitory, computer-readable media having instructions which, when executed by a control server in an electronic system, cause the control server to perform a method for managing virtualized user sessions in an electronic system that provides virtualized session hosting services, the method comprising:
maintaining a pool of virtualized session capacity available from powered-on compute servers in the electronic system, the pool of virtualized session capacity having a size that varies in response to (i) demand for user sessions and (ii) a schedule, the schedule being initially predetermined and establishing for each of multiple time intervals extending over a predetermined period of time, a respective minimum session capacity to be kept available during that time interval;
allocating user sessions from the pool in response to requests for user sessions;
monitoring, over multiple instances of the predetermined period of time, a number of allocated user sessions during each of the multiple time intervals to generate session usage data for each of the multiple time intervals; and
adjusting the schedule based on the session usage data; and
powering on and off particular compute servers in the electronic system based on changes in at least one of the schedule and the demand for user sessions,
wherein maintaining the pool of virtualized session capacity is performed by a control loop, the control loop having a first mode in which the control loop maintains the minimum session capacity established by the schedule and a second mode in which the control loop maintains a session capacity based on a current number of allocated user sessions,
wherein the control loop operates in the first mode when the current number of allocated user sessions is less than the minimum session capacity specified by the schedule for the respective time interval, and
wherein the control loop operates in the second mode when the current number of allocated user sessions exceeds the minimum session capacity specified by the schedule for the respective time interval.

17. The computer program product of claim 16, wherein, when operating in the second mode, the control loop causes the pool to maintain a buffer of user session capacity in excess of the current number of allocated user sessions, the buffer providing a capacity of user sessions that are available from one or more powered-on compute servers in the event that new requests for user sessions are received.

18. The computer program product of claim 17, wherein the method further comprises:
monitoring the control loop in the second mode to identify buffer incursions, the buffer incursions being instances in which user requests for user sessions are satisfied by allocating user sessions from the buffer; and
adjusting a size of the buffer in response to the monitored buffer incursions.

19. The method of claim 1, wherein multiple ones of the user sessions managed in the electronic system are operable by remote user machines that access the electronic system over a network, and wherein each of the multiple user sessions hosts a virtual desktop or a virtualized application.

20. The method of claim 1, wherein the electronic system runs each of the multiple user sessions in a respective container, each container providing an isolated userspace instance, and wherein multiple ones of the containers run together on a common operating system kernel that runs on a single compute server.

* * * * *